(12) United States Patent  
Hauser

(10) Patent No.: US 6,170,243 B1
(45) Date of Patent: Jan. 9, 2001

(54) BRAKE MECHANISM

(75) Inventor: Hans Hauser, Strongsville, OH (US)

(73) Assignee: MTD Products Inc, Cleveland, OH (US)

( * ) Notice: Under 35 U.S.C. 154(b), the term of this patent shall be extended for 0 days.

(21) Appl. No.: 08/992,387

(22) Filed: Dec. 17, 1997

(51) Int. Cl.⁷ .................................................. A01D 45/02
(52) U.S. Cl. .............................. 56/113; 60/442; 188/71.5
(58) Field of Search ................................ 188/71.4, 71.5, 188/72.7, 72.8; 60/442, 435; 192/4 A, 13 A; 56/113

(56) References Cited

U.S. PATENT DOCUMENTS

| | | |
|---|---|---|
| 1,793,470 | 2/1931 | Enderby . |
| 1,875,434 | 9/1932 | Frankland . |
| 2,329,097 | 9/1943 | Ash ........................................ 188/18 |
| 2,337,756 | 12/1943 | Larson ................................... 74/522 |
| 2,930,452 | 3/1960 | Klaue ..................................... 188/72 |
| 3,106,990 | 10/1963 | Kershner ............................... 188/72 |
| 3,261,433 | 7/1966 | Page ..................................... 188/196 |
| 3,392,805 | 7/1968 | Kreitner ................................. 188/72 |
| 3,543,886 | 12/1970 | Campbell ............................. 188/71.4 |
| 3,583,529 | 6/1971 | Robinson .............................. 188/71.4 |
| 3,693,763 | 9/1972 | Powilleit ............................... 188/71.4 |
| 3,842,948 | 10/1974 | Fredrick ............................... 188/71.4 |
| 3,997,031 | 12/1976 | Klaue .................................. 188/71.4 |
| 4,213,519 | 7/1980 | Moser et al. ......................... 188/71.4 |
| 4,217,974 | 8/1980 | Holcomb, Jr. ........................ 188/77 |
| 4,235,310 | * 11/1980 | Kibler et al. ........................ 188/71.5 |
| 4,613,020 | 9/1986 | Deem et al. ......................... 180/196 |
| 4,694,942 | * 9/1987 | Ogano et al. ....................... 192/13 A |
| 4,768,624 | 9/1988 | Green et al. ........................ 188/71.4 |
| 4,768,625 | 9/1988 | Price et al. .......................... 188/71.4 |
| 4,909,359 | * 3/1990 | Fujinami et al. .................... 188/71.5 |
| 5,012,901 | 5/1991 | Campbell et al. ................... 188/71.4 |
| 5,033,591 | 7/1991 | Price .................................. 188/71.4 |
| 5,040,649 | * 8/1991 | Okada ................................. 192/4 A |
| 5,090,949 | * 2/1992 | Thoma et al. ......................... 475/83 |
| 5,368,137 | * 11/1994 | Clemens ............................. 188/71.5 |
| 5,394,699 | 3/1995 | Matsufuji ............................. 60/442 |

* cited by examiner

Primary Examiner—Robert J. Oberleitner
Assistant Examiner—Pamela J. Lipka
(74) Attorney, Agent, or Firm—Emerson & Associates; Roger D. Emerson; Daniel A. Thomson

(57) ABSTRACT

A brake mechanism is provided for use in braking an axle within an axle housing on an associated vehicle. The brake mechanism includes a brake stack, an actuation plate, a pressure plate, gears means for operatively connecting a brake pedal to the actuation plate and for indicating the wear condition of the brake mechanism.

5 Claims, 10 Drawing Sheets

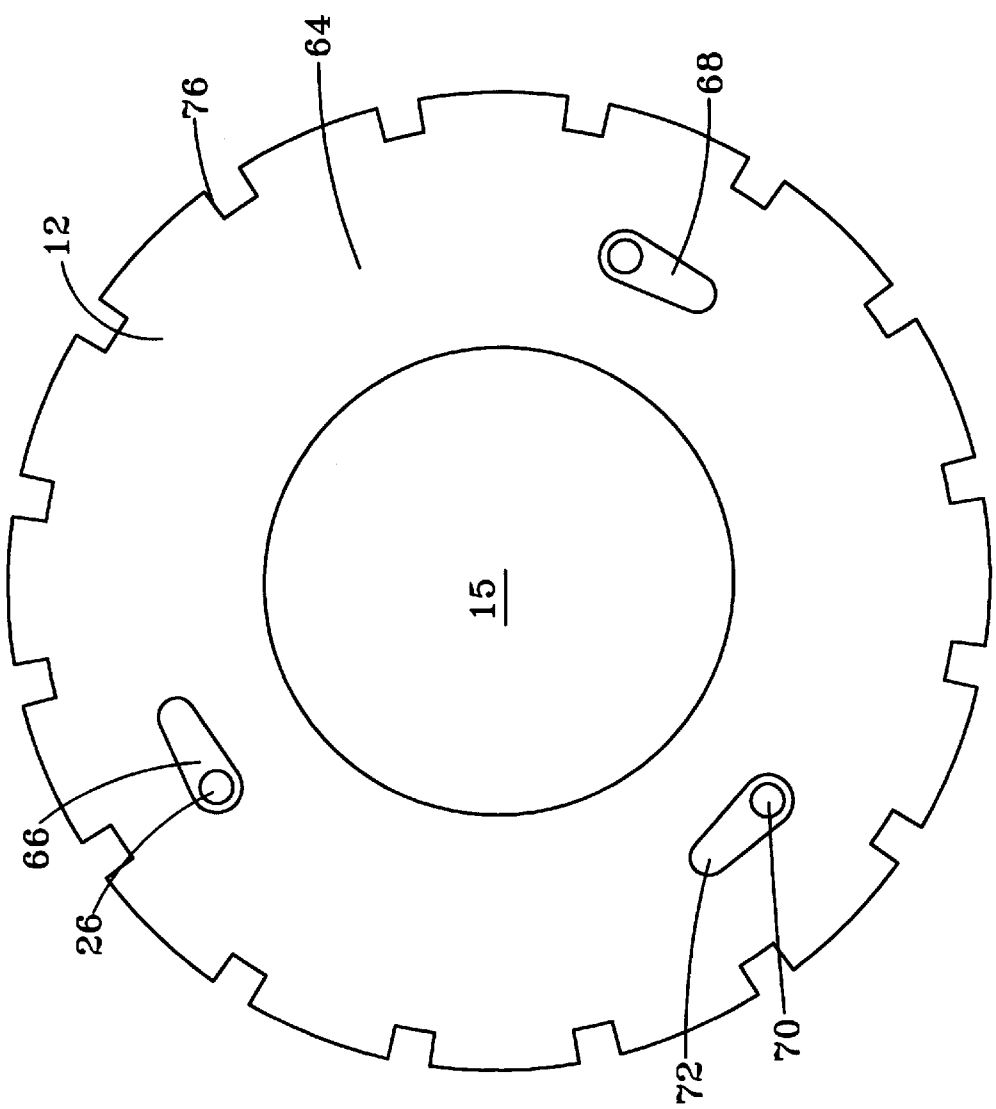
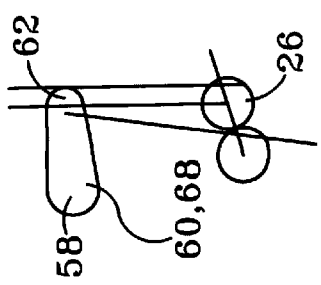
FIG-6
FIG-5

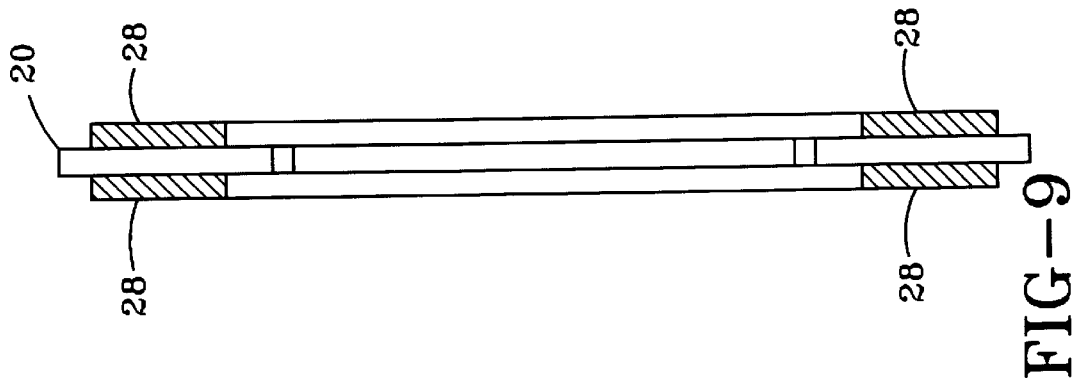
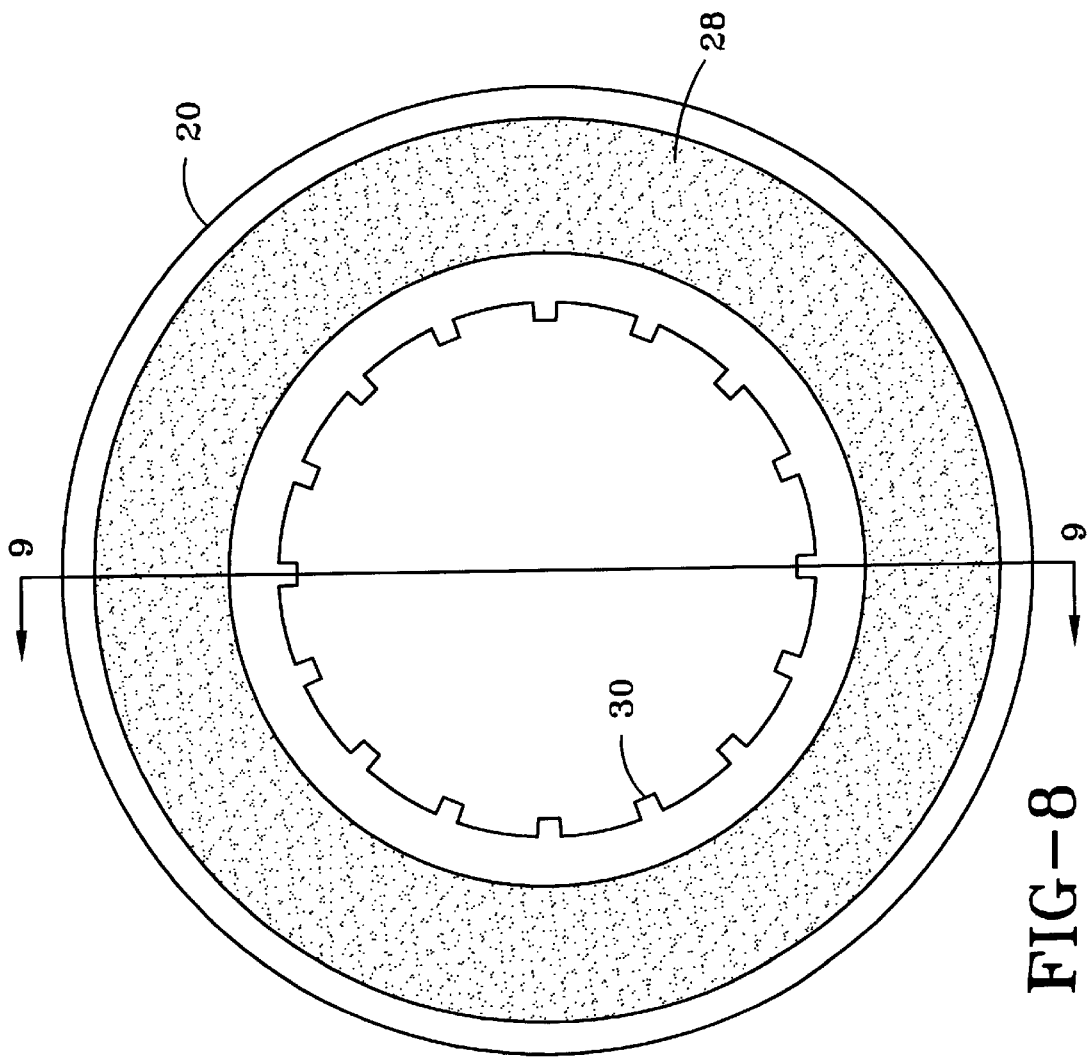

BRAKE MECHANISM

BACKGROUND OF THE INVENTION

1. Field of Invention

This invention relates to an improvement in disc brakes in which relatively stationary and rotatable surfaces are brought into frictional engagement by the axial separation of an actuation plate and a cooperating pressure plate. Between the actuation plate and the pressure plate are arranged angularly spaced balls which work in complimentary ramps positioned within depressions in the adjacent surfaces of the plates.

2. Description of the Related Art

It is known in the art to provide a disc brake in which relatively stationary and rotatable surfaces are brought into frictional engagement by axial separation of a pair of pressure plates. Typically, angularly spaced balls are arranged and work within inclined depressions in adjacent surfaces between the pressure plates to separate the pressure plates. The disc brake has rotatable surfaces that are formed on discs splined, or otherwise keyed, for rotational movement on a rotatable shaft. The discs provide the rotatable surfaces and are axially slidable on the shaft. Stationary surfaces are formed by end walls of a housing enclosing the discs and the pressure plates.

In a spreading-type multiple disc brake, the pressure plates are usually centralized within a housing. The axial separation of the plates is accomplished by providing a means for initiating angular movement of the pressure plates relative to each other in order to separate the pressure plates. The separation of the pressure plates causes the other surfaces of the brake discs to come into frictional engagement. The pressure plates are then rotated by the rotating surfaces until one plate abuts a stop on the housing. Generally, a cam mechanism causes the axial separation of the pressure plates and thereby engagement of the other brake discs with each other. The cam mechanism has balls operated in conjunction with ramps in adjacent surfaces of the plates. A brake applying mechanism moves the pressure plates angularly relative to each other, and in opposite directions, thus engaging the balls or rollers with the ramps defined by the recesses. This causes the pressure plates to move apart and into engagement with friction discs. The friction, or rotating discs, are then urged into engagement with the stationary braking surfaces.

Often a disc type brake device is mounted on a shaft projecting outside the housing. This makes the brake devices vulnerable to damage due to corrosion and extraneous matter such as dust and dirt. Such brake devices may therefore require excessive maintenance.

SUMMARY OF THE INVENTION

According to one aspect of the present invention, there is provided a brake mechanism for use in braking an axle within an axle housing on an associated vehicle. The vehicle has brake initiating means such as a brake pedal for selectively initiating the brake mechanism. The brake mechanism includes a brake stack for selectively braking the axle. The brake stack has a first rotating disc operatively connected to the axle and a first stationary disc operatively connected to the axle housing. The brake mechanism also includes an actuation plate for use in activating the brake mechanism, a pressure plate for use in forcing the first rotating disc against the first stationary disc and gearing means operatively connecting the brake initiating means to the actuation plate.

According to another aspect of the present invention, the gearing means includes a brake lever gear having first and second teeth and a geared portion on an outer periphery of the actuation plate. The geared portion has first and second teeth receiving zones for selectively receiving the first and second teeth of the brake lever gear.

According to another aspect of the present invention, the brake mechanism also includes wear indicator means for indicating the wear condition of the brake mechanism. The brake mechanism includes a brake lever that has a rotational position corresponding to the wear condition of the brake mechanism. This brake lever is operatively connected to the wear indicator means.

According to still another aspect of the invention, there is provided a method for braking an axle. The method includes the steps of initiating a brake mechanism, rotating a brake lever gear, intermeshing first and second teeth from the brake lever gear with first and second teeth receiving zones of an actuation plate, rotating the actuation plate, forcing a pressure plate against a brake stack, and braking the axle.

One advantage of the present invention is that a gearing means provides an even and reliable contact area between the brake initiating means and the actuation plate of the brake mechanism.

Another advantage of the present invention is that wear indicator means is provided permitting the operator to sense the wear in the brake mechanism.

Another advantage of the present invention is that the brake mechanism is positioned within the axle housing and is therefore protected from all extraneous matters such as dust and dirt.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 5 is a schematic view illustrating the ramping effect of the arcuate depressions within the pressure plate.

FIG. 6 is a view of the first outer surface of the pressure plate showing the balls positioned within the depressions therein.

FIG. 8 is a front view of the rotating disc showing its toothed inner periphery.

FIG. 9 is a sectional side view of the rotating disc taken along the line 9—9 of FIG. 8 showing the frictional material attached to the rotating disc.

FIG. 14 is a perspective view of the brake stack showing the hub, the brake lever shaft, and the brake lever.

DESCRIPTION OF THE PREFERRED EMBODIMENT

Figure 1:
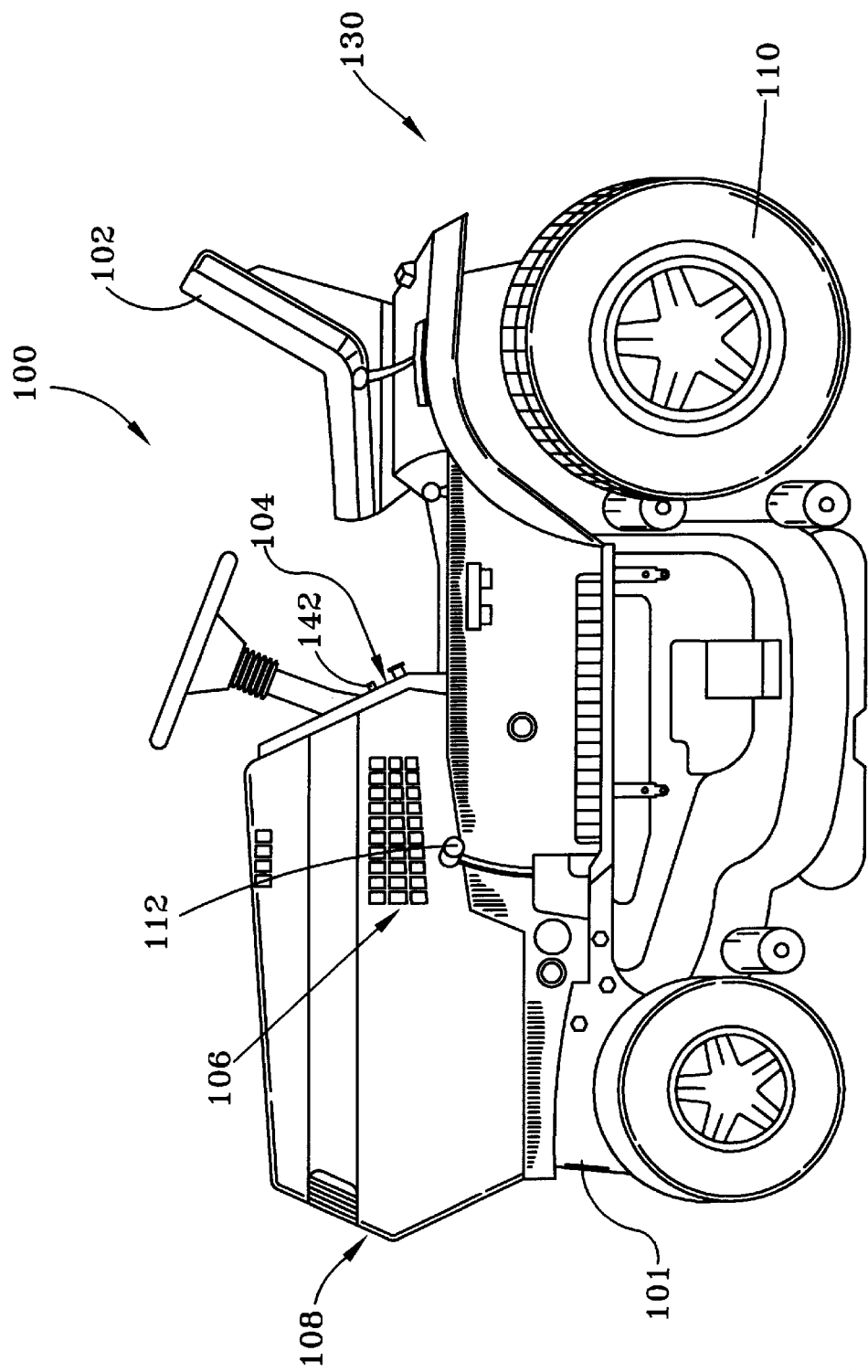
FIG. 1 is a perspective side view of a typical riding mower that is equipped with the brake mechanism of the present invention.

Referring now to the drawings wherein the showings are for purposes of illustrating a preferred embodiment of the invention only and not for purposes of limiting the same, FIG. I shows a riding mower 100 which is equipped with a brake mechanism 130 in accordance with this invention. This illustrated embodiment is directed to a riding lawn mower but the invention is applicable to other vehicles and other applications as well. The riding mower 100 includes a frame 101, an operator seat 102, a control panel 104, a brake initiating means 106 and an engine 108. The engine 108, as is commonly known in the art, transmits power to wheels 110 that are operatively attached to the frame 101 through an axle 14 (shown in FIG. 3). In this way the engine 108 provides locomotion for the riding mower 100. An operator, by implementing the brake initiating means 106, initiates the brake mechanism 130 thereby braking or stopping the wheels 110 and preventing the locomotion of the riding mower 100. The brake initiating means 106 can be of any type chosen with sound engineering judgment but in the preferred embodiment includes a brake pedal 112 as commonly known in the art.

Figure 2:
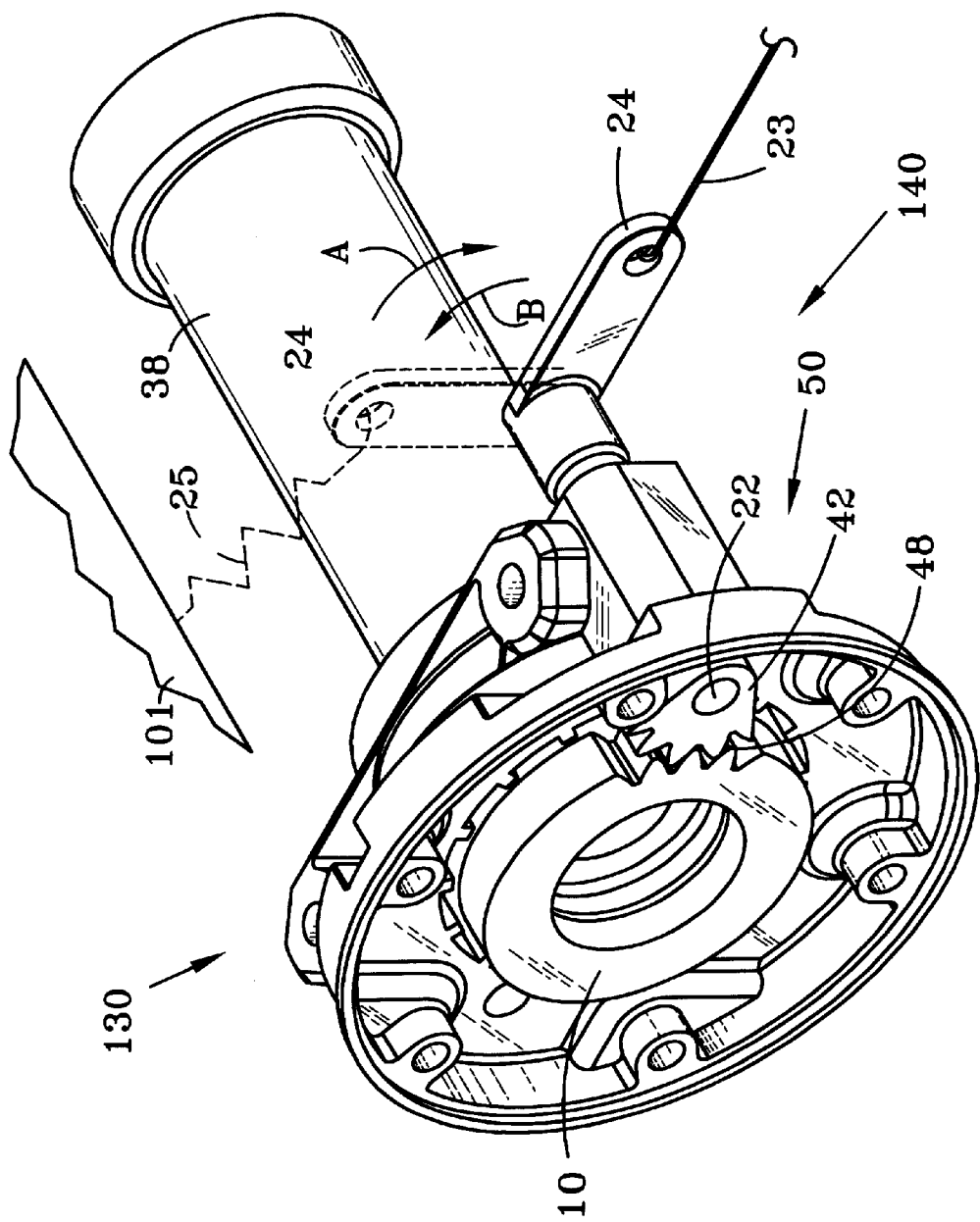
FIG. 2 is a perspective view of the axle housing apart from the axle showing the gearing means and the possible positions of the brake lever as the brake mechanism wears.
Figure 3:
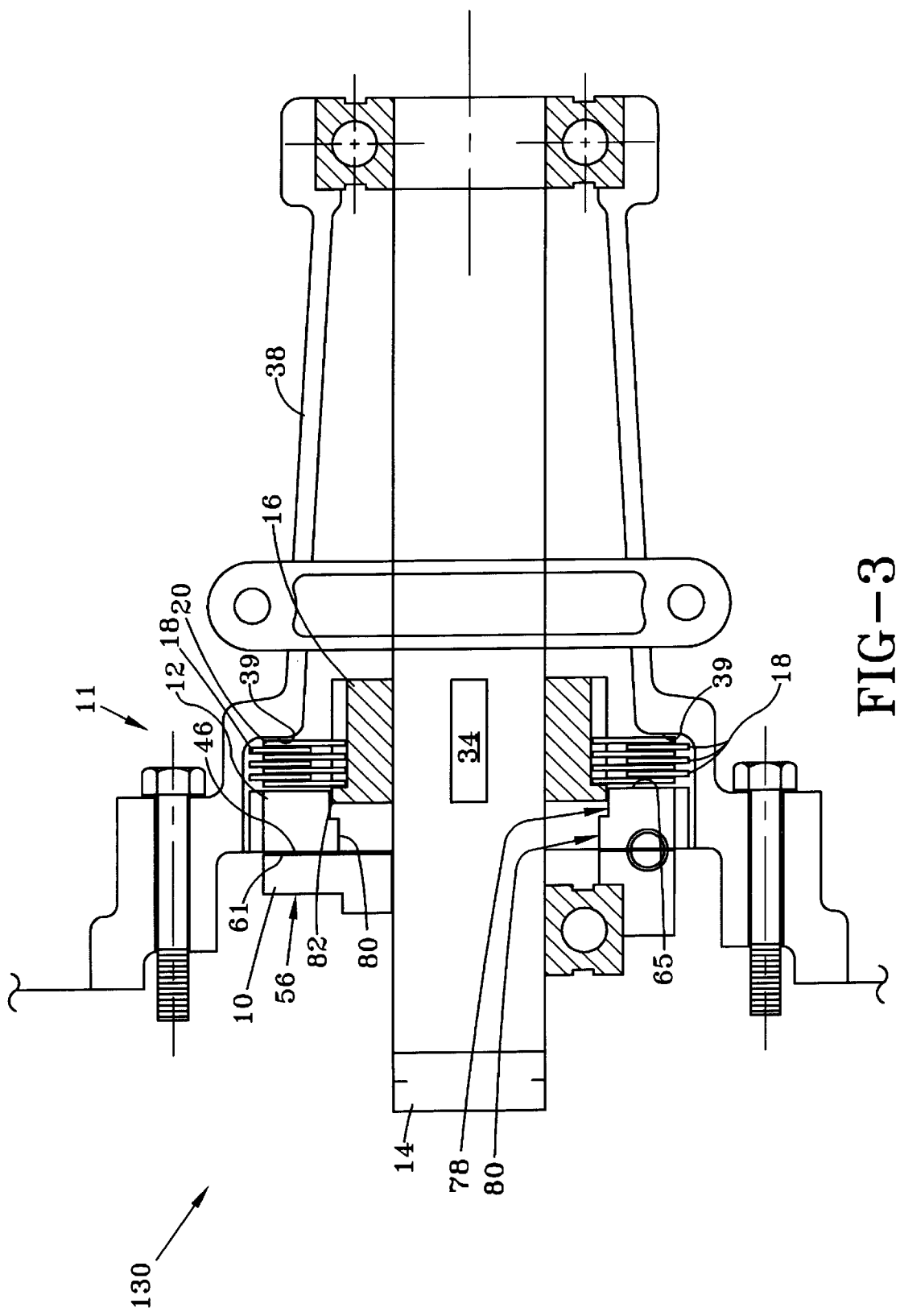
FIG. 3 is a sectional view showing the positions of the actuation plate, the pressure plate, the brake stack and the hub along the axis of the axle.
Figure 4:
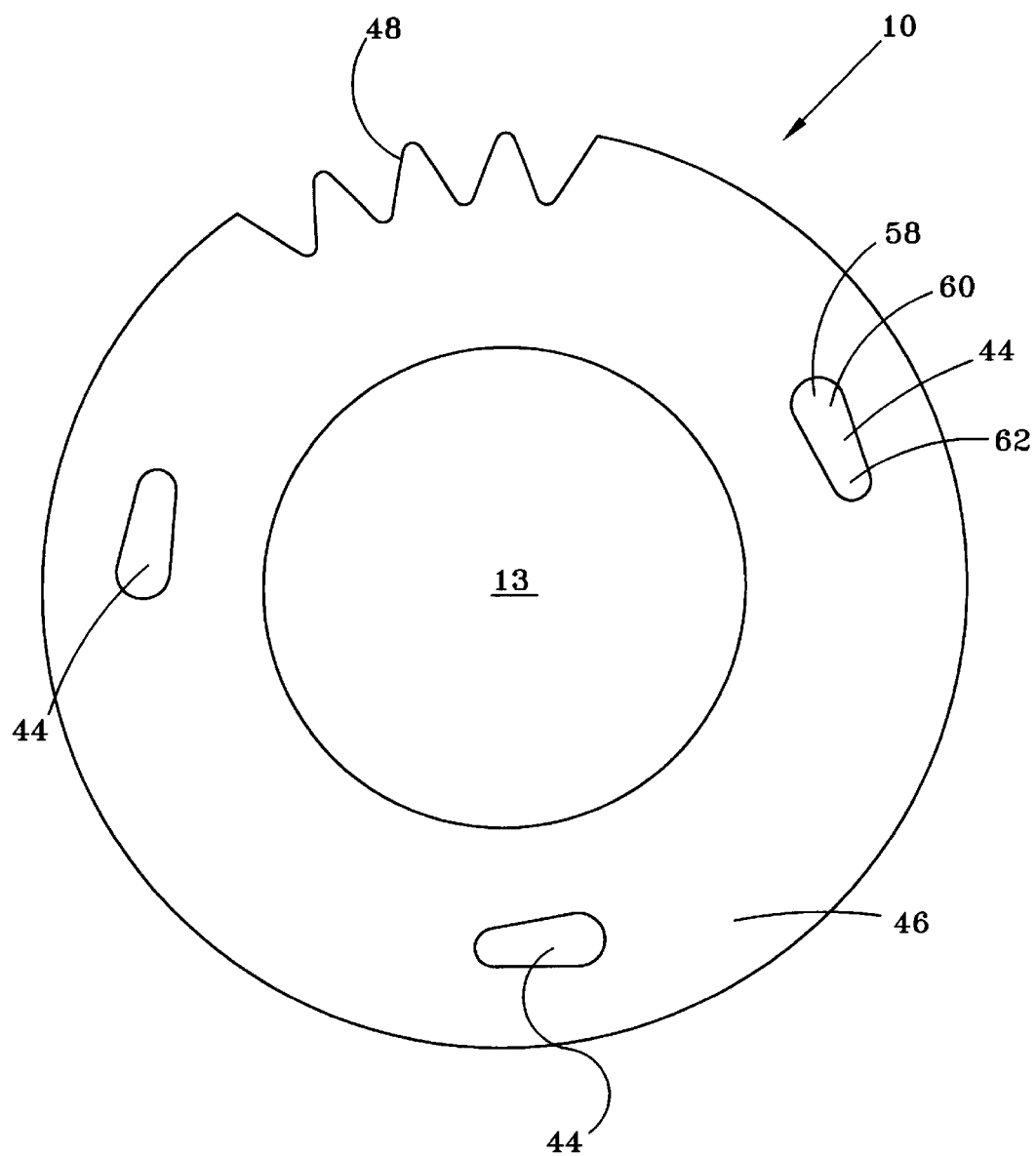
FIG. 4 is a view of the first outer surface of the actuation plate showing the depressions therein.
Figure 7:
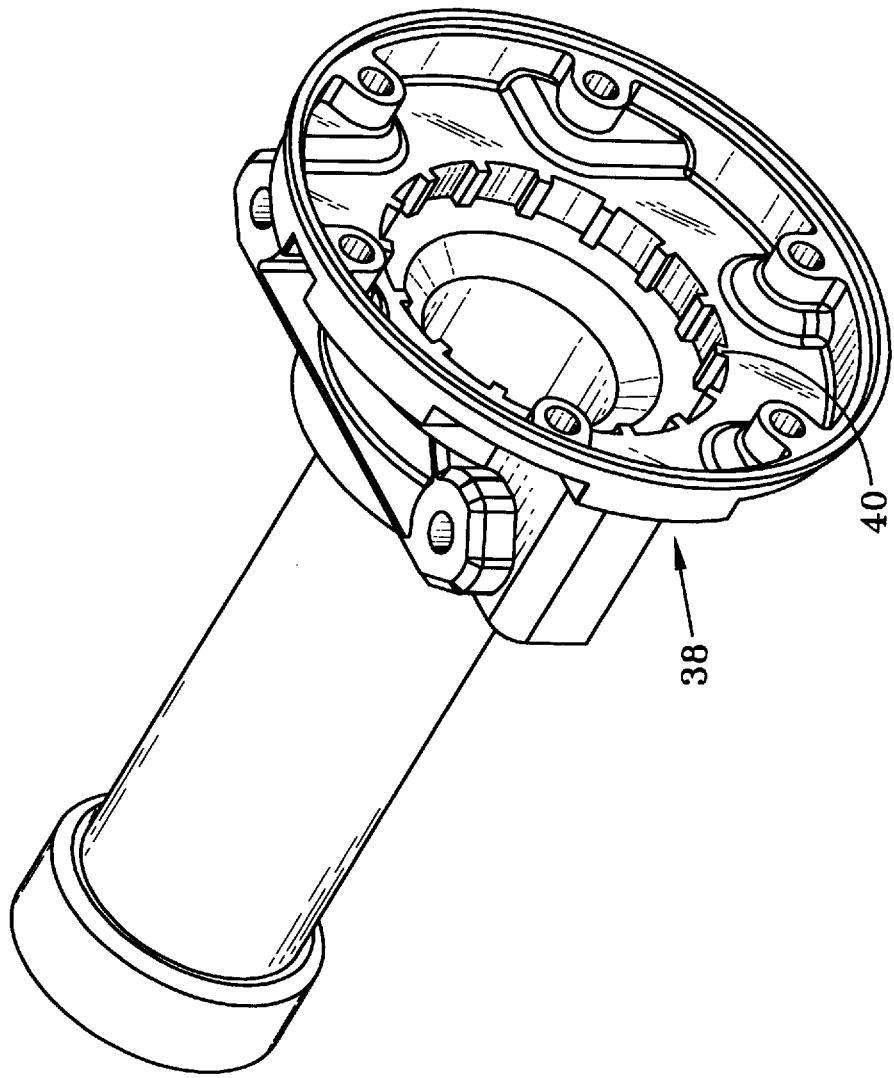
FIG. 7 is a perspective view of the axle housing showing the toothed inner periphery.
Figure 11:
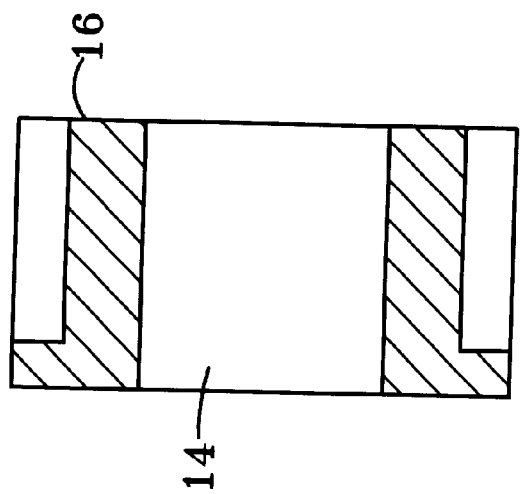
FIG. 11 is a sectional side view of the hub taken along the line 11—11 of FIG. 10.
Figure 10:
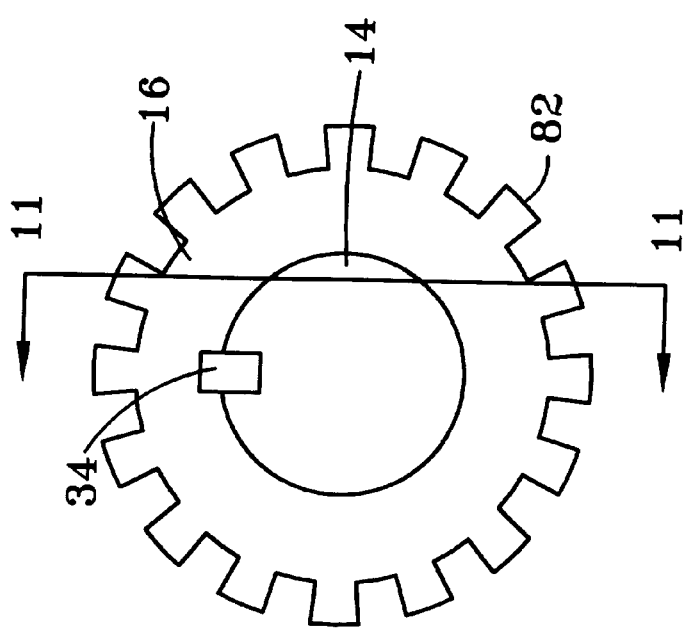
FIG. 10 is a front view of the hub showing the toothed outer periphery and the key that holds the hub to the axle.
Figure 12:
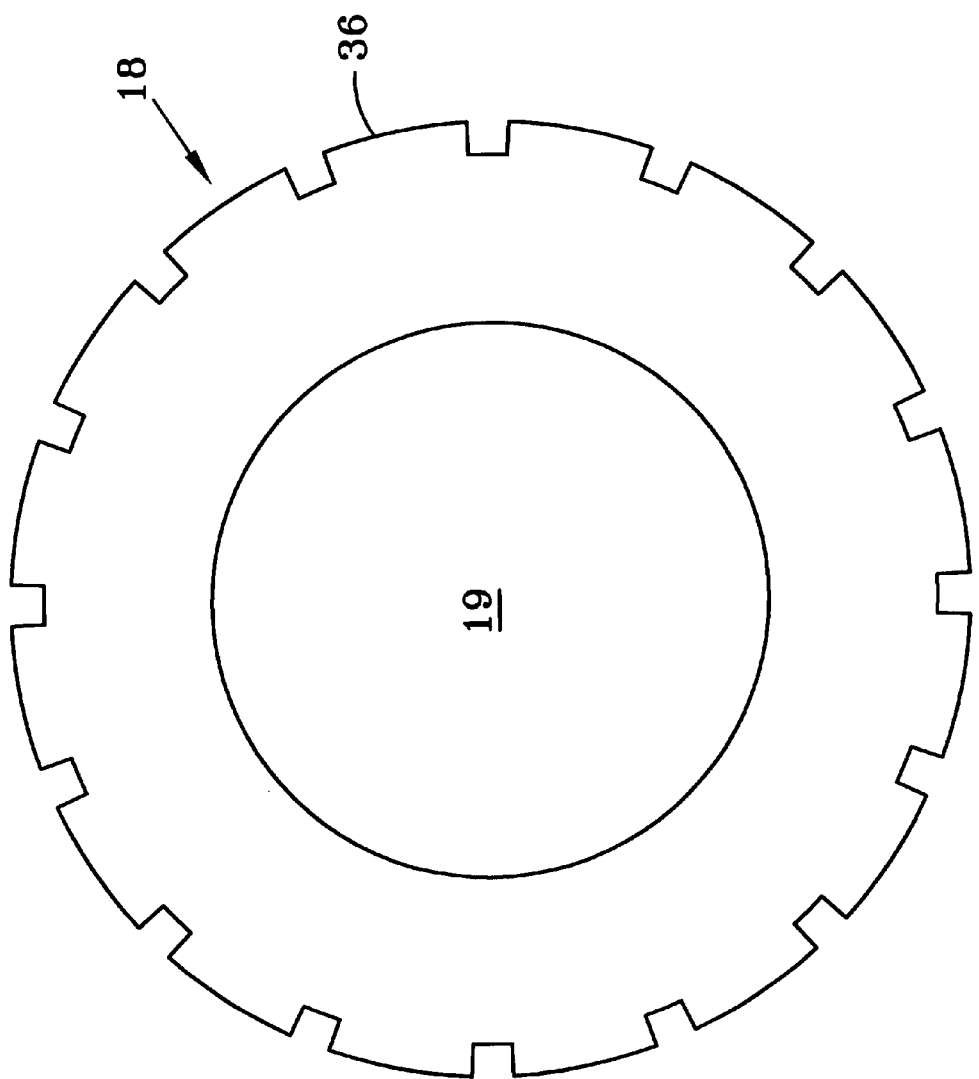
FIG. 12 is a front view of a stationary disc showing the toothed outer periphery and the hub opening.
Figure 13:
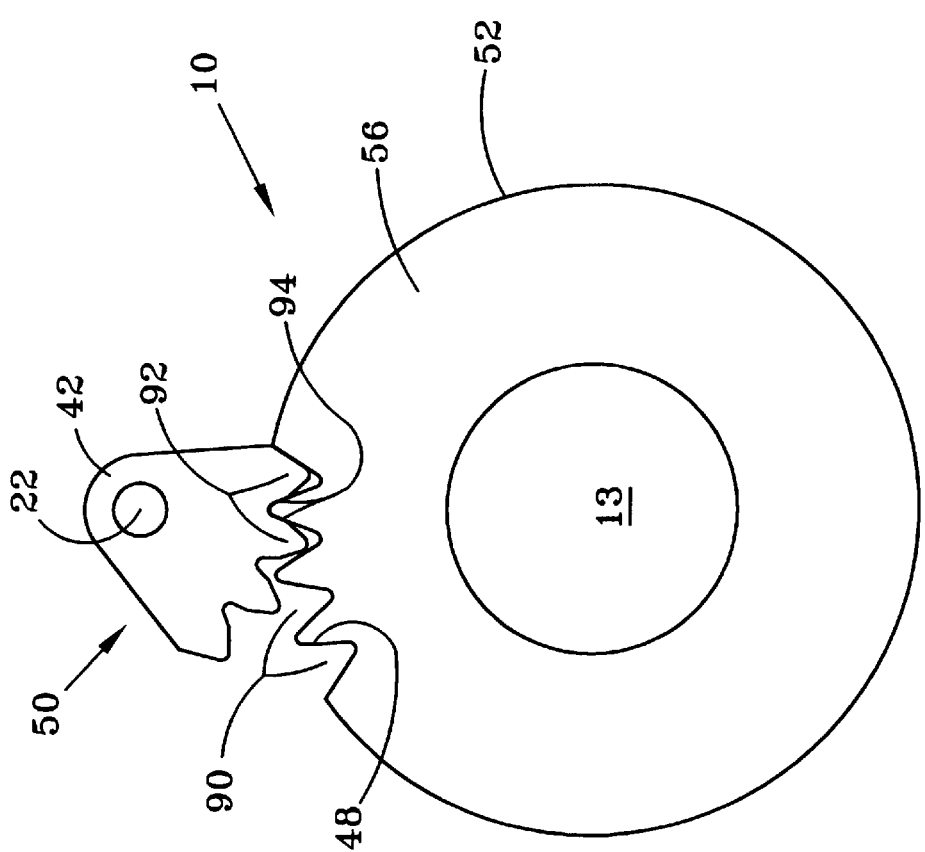
FIG. 13 is a front view of the actuation plate showing how the brake lever gear engages the geared portion of the actuation plate.

With reference now to FIGS. 1–3, an axle 14 is positioned within an axle housing 38, is rotated by the engine 108, and thereby rotates the wheels 110 in a manner well known in the art. A brake linkage 23 operatively connects the brake initiating means 106 to a brake lever 24 that is fixedly attached to a brake lever shaft 22. The brake linkage 23 can be of any type currently known in the art. The brake lever 24 is held in a non-braking position by a brake return spring 25. The brake return spring 25 is operatively connected to the frame 101 of the riding mower 100 in a manner commonly known in the art. Rotation of the brake lever 24 and brake lever shaft 22 by the brake initiating means 106 operates the brake mechanism 130 as will be discussed further below.

With reference now to FIGS. 1–4 and 13, the brake mechanism 130 is positioned within the axle housing 38 and includes an actuation plate 10 having an actuation opening 13 for receiving the axle 14. The actuation plate 10 has first and second outer surfaces 46, 56. The first outer surface 46 has arcuate recesses or depressions 44 each having larger arcuate portions 58 that extend to smaller arcuate portions 62. Within each depression 44 is a ramp 60 that increases in depth from the smaller arcuate portion 62 to the larger arcuate portion 58. The depressions 44 are configured to receive balls 26 (shown in FIGS. 5–6) that can roll and/or slide along the ramps 60 as will be discussed further below. The actuation plate 10 has an outer periphery 52 with a geared portion 48 as will be discussed further below.

With reference now to FIGS. 2–4 and 13, gearing means 50 operatively connects the actuation plate 10 to the brake initiating means 106. In the preferred embodiment, the gearing means 50 includes a geared portion 48 on the outer periphery 52 of the actuation plate 10 that has at least two teeth receiving zones 90. As can be seen from FIG. 4, the actuation plate 10 has an inner periphery (shown, but not referenced) that has a diameter that is less than the diameter of the outer periphery 52. The teeth receiving zones 90 selectively receive teeth 92 from a brake lever gear 42 that is fixedly attached to the brake lever shaft 22. Preferably the brake lever gear 42 has at least two teeth 92. It should be noted that the use of the gearing means 50 including at least the two teeth receiving zones 90 and the two teeth 92 increases contact area 94 between the geared portion 48 and the brake lever gear 42 as compared to a single tooth and a single tooth receiving zone. As the number of teeth receiving zones 90 and corresponding teeth 92 increase, so does the overall contact area 94. By increasing the contact area 94 wear is reduced and precise adjustment is increased. This improves the overall performance of the gearing means 50 and thus the brake mechanism 130. In the preferred embodiment shown in FIGS. 2, 4 and 13, the geared portion 48 has four teeth receiving zones 90 and the brake lever gear 42 has four teeth 92. Of course the actual number of teeth 92 and teeth receiving zones 90 may vary with this invention.

With reference now to FIGS. 3 and 5–6, the brake mechanism 130 also includes a pressure plate 12 having a plate opening 15 for receiving the axle 14 and a hub 16. The pressure plate 12 has first and second outer surfaces 64, 65. The first outer surface 64 has arcuate recesses or depressions 66 that are formed similar to the depressions 44 formed in the actuation plate 10 (shown in FIG. 4). In the preferred embodiment, the depressions 66 in the pressure plate 12 are identical in size and shape to the depressions 44 in the actuation plate 10. Each depression 66 has a larger arcuate portion 70 that extend to smaller arcuate portion 72. Within each depression 66 is a ramp 68 that increases in depth from the smaller arcuate portion 72 to the larger arcuate portion 70. The depressions 66 are configured to receive balls 26 that can roll and/or slide along the ramps 68. The second outer surface 65 of the pressure plate 12 operatively contacts a later to be described brake stack 11.

With reference now to FIGS. 3, 6–7 and 10–11, the pressure plate 12 has a toothed outer periphery 76 that operatively engages with a toothed inner periphery 40 of the axle housing 38. The pressure plate 12 also has first and second inner peripheries 78, 80. The first inner periphery 78 has a diameter larger than the second inner periphery 80 and large enough to extend over a toothed outer periphery 82 of the hub 16. The hub 16 is keyed to the axle 14 by a key 34 in a manner commonly known in the art. Other means to attach the hub 16 to the axle 14 may include welding or splining. By keying the hub 16 to the axle 14, it is easy to replace the hub 16, if necessary, without having to replace the entire axle 14.

With reference to FIGS. 3–6 and 13, the first outer surface 46 of the actuation plate 10 faces and is laterally spaced from the first outer surface 64 of the pressure plate 12. The depressions 44 of the actuation plate 10 are positioned in operative relationship with the depressions 66 in the pressure plate 12. In this way a single ball 26 is simultaneously positioned within a single depression 44 and 66. When the brake mechanism 130 is not being operated for braking purposes, the balls 26 are positioned in the larger arcuate portions 58, 70 of the depressions 44, 66. When the brake mechanism 130 is operated, the actuation plate 10 is rotated by the gearing means 50. During this rotation, the balls 26 roll and/or slide up the ramps 60, 68 into the smaller arcuate portions 62, 72. This forces the actuation plate 10 and the pressure plate 12 to rotate relative to each other and to separate from each other. This forces the pressure plate 12 against the brake stack 11. In this way the ramps 60, 68 operate like cams. Preferably, the balls 26 are made out of stainless steel such as ball bearings.

With reference now to FIGS. 3, 8–12 and 14, the brake stack 11 is positioned between the pressure plate 12 and an inner surface 39 of the axle housing 38 for frictional contact therebetween. The brake stack 11 includes rotating discs 20 and stationary discs 18. Although four rotating discs 20 and three stationary discs 18 are shown in FIG. 3, it should be noted that the number of rotating discs 20 and stationary discs 18 used with this invention can be any number chosen with sound engineering judgment. Each rotating disc 20 has a toothed inner periphery 30 for meshing with the toothed outer periphery 82 (shown in FIG. 10) of the hub 16. The rotating discs 20 have frictional material 28 on their outer surfaces that generally wears corresponding to the amount of use of the braking mechanism 100. It should be noted that the frictional material 28 could alternately be attached to the outer surfaces of the stationary discs 18. The rotating discs 20 have an outside diameter approximately equal to the outside diameter of the pressure plate 10. The stationary discs 18 are positioned between the rotating discs 20 also for frictional contact therebetween. The stationary discs 18 each have a hub opening for rotatably receiving the hub 16 and a toothed outer periphery 36 that meshes with the toothed inner periphery 40 of the axle housing 38. It should be noted that the pressure plate 12, the stationary discs 18, and the rotating discs 20 move axially along the axle 14 when the actuation plate 10 is rotated.

With reference now to FIGS. 1–14, the operation of the brake mechanism 130 will now be discussed. When it is required to stop or slow the locomotion of the riding mower 100, the operator activates the brake initiating means 106 such as by stepping on the brake pedal 112. This causes the brake lever 24 to overcome the spring force of the brake return spring 25. Thus the brake lever 24 and the brake lever shaft 22 rotate in direction A as shown in FIG. 2. This rotation is transferred to the gearing means 50. In particular, this rotation causes the brake lever gear 42 to rotate in the same direction thereby causing the actuation plate 10 to rotate in the opposite direction. In other words, if the brake lever gear 42 is rotated in a clockwise direction, the actuation plate 10 is rotated in a counterclockwise direction as the teeth 92 intermesh with the teeth receiving zones 90. The rotation of the actuation plate 10 causes the balls 26 within the larger arcuate portions 58, 70 of the depressions 44, 66 to move up the ramps 60, 68 into the smaller arcuate portions 62, 72. This forces the pressure plate 12 along the axle 14, away from the actuation plate 10, and against the brake stack 11. As the brake stake 11 is forced against the inner surface 39 of the axle housing 38, the frictional material 28 on the rotating discs 20 contacts the stationary discs 18. This contact slows and then stops the rotation of the rotating discs 20 and the axle 14. This in turn slows and stops the wheels 110 and thus the riding mower 100.

With continuing reference to FIGS. 1–4, to disengage the brake mechanism 130 and thereby permit locomotion of the riding mower 100, it is only necessary for the operator to stop activating the brake initiating means 106 such as by releasing the brake pedal 112. This releases the braking forces from the brake lever 24 and permits the spring force from the brake return spring 25 to rotate the brake lever 24 in direction B as shown in FIG. 2. This rotates the actuation plate 10 in the opposite direction, that is direction A, and permits the balls 26 within the smaller arcuate portions 62, 72 to move down the ramps 60, 68 into the larger arcuate portions 58, 70 of the depressions 44, 66. This allows the pressure plate 12 to move along the axle 14, toward the actuation plate 10, and away from the brake stack 11. As the brake stake 11 is released from the pressure brought by the pressure plate 12, the frictional material 28 on the rotating discs 20 comes out of contact with the stationary discs 18. This permits the rotation of the rotating discs 20, the axle 14, and in turn the wheels 110 of the riding mower 100.

With reference now to FIGS. 1–3, the wear aspects of the brake mechanism 130 will now be discussed. When the brake mechanism 130 is unworn the brake lever 24 is in the position shown by shaded lines in FIG. 2. As a braking force is applied, the brake lever 24 is rotated in direction A. When the brake is unworn, only a slight amount of rotational travel of the brake lever 24 in direction A is needed to rotate the actuation plate 10. As the frictional material 28 on the rotating discs 20 begins to wear, however, greater rotational travel is necessary for the actuation plate 10 to press against the pressure plate 12 with sufficient force. The position of the brake lever 24 before a braking force is applied moves in direction A as the brake mechanism 130 wears. When the brake mechanism 130 is fully worn the brake lever 24 is in the position shown by solid lines in FIG. 2.

With reference now to FIGS. 1–2, the brake mechanism 130 may also include wear indicator means 140 operatively connected to the brake lever 24 for indicating the current wear condition. The wear indicator means 140 can be of any type chosen with sound engineering judgment such as an indicator gauge (not shown). Alternately or in combination a warning light 142 may be incorporated on the control panel 104 to warn the operator when the frictional material 28 has met it's wear limit. The warning light 142 may be selectively lit by a switch (not shown) that is switched by the brake lever 24.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A riding mower comprising:

a frame;

an axle operatively attached to said frame;

an axle housing for housing said axle;

wheels operatively connected to said axle;

an engine for providing locomotion for said riding mower, said engine being operatively connected to said axle;

brake initiating means for use in selectively slowing and stopping said wheels; and, a brake mechanism positioned within said axle housing, said brake initiating means selectively initiating said brake mechanism, said brake mechanism including, 1) a brake stack for selectively braking said axle, said brake stack having, (a) a first rotating disc operatively connected to said axle, said first rotating disc having an outer surface with frictional material attached thereto, (b) a first stationary disc operatively connected to said axle housing, said axle housing preventing rotational movement of said first stationary disc, said first stationary disc selectively contacting said first rotating disc for frictional contact therebetween, 2) an actuation plate for use in actuating said brake mechanism,
3) a pressure plate for use in forcing said first rotating disc against said first stationary disc,
4) gearing means operatively connecting said brake initiating means to said actuation plate,
a brake lever gear having first and second teeth, said brake lever gear being selectively rotatable by said brake initiating means;
a geared portion on an outer periphery of said actuation plate, said geared portion having first and second teeth receiving zones for selectively receiving said first and second teeth,
a hub fixedly attached to said axle, said first rotating disc being fixedly attached to said hub, said first stationary disc having a hub opening for rotatably receiving said hub,
wear indicator means for indicating the wear condition of said brake mechanism,
a brake lever operatively connected to said brake initiating means and to said actuation plate, said brake lever having a rotational position that corresponds to the wear condition of said brake mechanism, said brake lever being operatively connected to said wear indicator means; and,
wherein said pressure plate has first and second inner peripheries, said first inner periphery having a diameter greater than the diameter of said second inner periphery, said first inner periphery selectively receiving said hub.

2. A riding mower comprising:
a frame;
an axle operatively attached to said frame;
an axle housing for housing said axle;
wheels operatively connected to said axle;
an engine for providing locomotion for said riding mower, said engine being operatively connected to said axle;
brake initiating means for use in selectively slowing and stopping said wheels;
a brake mechanism positioned within said axle housing, said brake initiating means selectively initiating said brake mechanism, said brake mechanism including,
1) a brake stack for selectively braking said axle, said brake stack having;
(a) a first rotating disc operatively connected to said axle, said first rotating disc having an outer surface with frictional material attached thereto,
(b) a first stationary disc operatively connected to said axle housing, said axle housing preventing rotational movement of said first stationary disc, said first stationary disc selectively contacting said first rotating disc for frictional contact therebetween;
2) an actuation plate for use in actuating said brake mechanism,
3) a pressure plate for use in forcing said first rotating disc against said first stationary disc;
4) gearing means operatively connecting said brake initiating means to said actuation plate;
a brake lever gear having first and second teeth, said brake lever gear being selectively rotatable by said brake initiating means;
a geared portion on an outer periphery of said actuation plate, said geared portion having first and second teeth receiving zones for selectively receiving said first and second teeth;
a hub fixedly attached to said axle, said first rotating disc being fixedly attached to said hub, said first stationary disc having a hub opening for rotatably receiving said hub wear indicator means for indicating the wear condition of said brake mechanism;
a brake lever operatively connected to said brake initiating means and to said actuation plate, said brake lever having a rotational position that corresponds to the wear condition of said brake mechanism, said brake lever being operatively connected to said wear indicator means;
wherein said pressure plate has first and second inner peripheries, said first inner periphery having a diameter greater than the diameter of said second inner periphery, said first inner periphery selectively receiving said hub; and,
wherein said axle housing has a toothed inner periphery, said pressure plate having a toothed outer periphery that operatively engages with said toothed inner periphery of said axle housing, said first stationary disc having a toothed outer periphery that operatively engages with said toothed inner periphery.

3. A brake mechanism for use in braking an associated axle within an associated axle housing on an associated vehicle having brake initiating means for selectively initiating said brake mechanism, said brake mechanism comprising:
a brake stack for selectively braking the associated axle, said brake stack having;
(a) a first rotating disc operatively connected to the associated axle, said first rotating disc having an outer surface with frictional material attached thereto;
(b) a first stationary disc operatively connected to the associated axle housing, the associated axle housing preventing rotational movement of said first stationary disc, said first stationary disc selectively contacting said first rotating disc for frictional contact therebetween;
an actuation plate for use in actuating said brake mechanism;
a pressure plate for use in forcing said first rotating disc against said first stationary disc;
gearing means operatively connecting the brake initiating means to said actuation plate;
a brake lever gear having first and second teeth, said brake lever gear being selectively rotatable by the brake initiating means;
a geared portion on an outer periphery of said actuation plate, said geared portion having first and second teeth receiving zones for selectively receiving said first and second teeth;
a hub fixedly attached to said axle, said first rotating disc being fixedly attached to said hub, said first stationary disc having a hub opening for rotatably receiving said hub; and,
wherein said pressure plate has first and second inner peripheries, said first inner periphery having a diameter greater than the diameter of said second inner periphery, said first inner periphery selectively receiving said hub.

4. The brake mechanism of claim 3 further comprising:
wear indicator means for indicating the wear condition of said brake mechanism, said wear indicator means being operatively connected to a warning light to warn the operator when said brake mechanism has met a wear limit.

5. The brake mechanism of claim 4 wherein said brake mechanism further comprises:

a brake lever operatively connected to the brake initiating means and to said actuation plate, said brake lever having a rotational position that corresponds to the wear condition of said brake mechanism, said brake lever being operatively connected to said wear indicator means.

* * * * *